United States Patent
Watanbe et al.

(10) Patent No.: US 7,407,685 B2
(45) Date of Patent: Aug. 5, 2008

(54) MAGNETIC RECORDING MEDIUM AND THE METHOD OF MANUFACTURING THE SAME

(75) Inventors: Sadayuki Watanbe, Nagano (JP); Yasushi Sakai, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 488 days.

(21) Appl. No.: 11/037,880

(22) Filed: Jan. 18, 2005

(65) Prior Publication Data

US 2005/0123807 A1 Jun. 9, 2005

Related U.S. Application Data

(62) Division of application No. 10/410,665, filed on Apr. 9, 2003, now abandoned.

(30) Foreign Application Priority Data

Apr. 9, 2002 (JP) .............................. 2002-106928

(51) Int. Cl.
*B05D 5/12* (2006.01)
(52) U.S. Cl. ........................ 427/127; 427/128; 427/130; 428/690
(58) Field of Classification Search ............... 427/127, 427/128, 130; 428/690
See application file for complete search history.

(56) References Cited

FOREIGN PATENT DOCUMENTS

| | | | |
|---|---|---|---|
| EP | 0555512 A1 | * | 8/1993 |
| JP | 363078339 A | * | 4/1988 |
| JP | 2000-268340 A | | 9/2000 |
| JP | 2001-043526 A | | 2/2001 |
| JP | 2001-43526 A | | 2/2001 |

OTHER PUBLICATIONS

Machine Translation of JP 2000-268340; JPO.*
Machine Translation of JP 2001-043526 A.
Jii Zou et al.; "High coercivity CoCrPt films achieved by post-deposition rapid thermal annealing"; Journel of Applied Physics, vol. 87, No. 9; May 1, 2000; pp. 6869-6871.
Notification of Reasons for Refusal issued in corresponding Japanese Patent Application No.2003-050980, with mailing date Jun. 19, 2007.

* cited by examiner

*Primary Examiner*—Alain L Bashore
(74) *Attorney, Agent, or Firm*—Rossi, Kimms & McDowell LLP

(57) ABSTRACT

A method of manufacturing a magnetic recording media includes a magnetic recording layer of a granular magnetic layer that has ferromagnetic crystal grains and an oxide nonmagnetic grain boundary or a nitride nonmagnetic grain boundary surrounding the ferromagnetic crystal grains. It further has an overcoating layer on the granular magnetic recording layer. The overcoating layer contains a nonmagnetic metal or a nonmagnetic alloy that can be diffused into the nonmagnetic grain boundary. The atoms coated on the granular magnetic recording layer diffuse into the nonmagnetic grain boundary even without being annealed, and promote to isolate the ferromagnetic crystal grains from each other. The overcoating can be removed after its formation to reduce the magnetic gap between the magnetic recording layer and the magnetic recording head.

2 Claims, 2 Drawing Sheets

MAGNETIC RECORDING MEDIUM AND THE METHOD OF MANUFACTURING THE SAME

CROSS-REFERENCE TO RELATED APPLICATION

This application is a divisional of U.S. application Ser. No. 10/410,665 filed on Apr. 9, 2003, now abandoned.

BACKGROUND

Various compositions for the magnetic layer, various structures for the magnetic layer, and various materials for the nonmagnetic underlayer have been proposed to obtain a magnetic recording medium exhibiting a high recording density. One of the magnetic layers used in practice employs a CoCr alloy and obtains isolated magnetic grains by segregating Cr to the crystal grain boundary. Another one of the magnetic layers used in practice is the so-called granular magnetic layer that includes a nonmagnetic and nonmetallic material for the grain boundary thereof. For segregating sufficient amount of Cr into the grain boundary, it is necessary and indispensable to heat the substrate at 200° C. or higher during forming the conventional CoCr alloy magnetic layer. In contrast, the specific feature of the granular magnetic layer is that the nonmagnetic and nonmetallic material segregates even when the substrate is not heated during forming the granular magnetic layer. For realizing a higher recording density, research and development have been explored vigorously on the perpendicular magnetic recording that orients the recording magnetization perpendicular to the recording plane of the medium in place of the parallel magnetic recording that orients the recording magnetization parallel to the recording plane of the medium. The CoCr magnetic layer and the granular magnetic layer described above are employable for the perpendicular magnetic recording by controlling the crystal orientation therein by means of an underlayer.

It is required for both the CoCr magnetic layer and the granular magnetic layer to be thermally stable and cause less media noises. For improving the thermal stability, it is necessary to improve the crystalline magnetic anisotropy Ku. For reducing the media noises, it is necessary to minimize the crystal grain diameter in the magnetic recording layer and to reduce the magnetic interaction between the crystal grains. The crystalline magnetic anisotropy Ku in the CoCr magnetic layer is improved by adding an appropriate amount of Pt thereto. The magnetic interaction between the ferromagnetic crystal grains in the CoCr magnetic layer is reduced by promoting Cr segregation into the grain boundary by means of heating the substrate before forming the CoCr magnetic layer or by means of adding Ta or B to the CoCr magnetic layer. The other technique for segregation promotion, as reported in Journal of Applied Physics, Vol. 87, No. 9. pp. 6869-6871 (May 1, 2000), effectively isolates ferromagnetic crystal grains by depositing an Mn layer of 20 nm in thickness on a CoCrPt magnetic layer and by annealing the laminate at 350° C. for several minutes to diffuse Mn into the grain boundary of the CoCrPt magnetic layer.

For reducing the media noises and for realizing a high magnetic recording density, it is necessary to minimize the grain diameter in the magnetic recording layer and to magnetically isolate the crystal grains in the magnetic recording layer without impairing the thermal stability. However, the productivity of the above described segregation promotion technique that deposits an Mn layer on a CoCrPt layer and anneals the laminate is not that good since it takes several minutes for Mn to sufficiently diffuse into the grain boundary of the CoCrPt layer. Moreover, it is difficult to obtain a large signal output for the segregation promotion technique that deposits an Mn layer on a CoCrPt layer since the spacing between the magnetic head and the magnetic recording layer is greater due to the Mn layer of 20 nm in thickness on the CoCrPt layer, causing a low signal to noise ratio (SNR). In addition, the magnetic head floats less stably since the magnetic layer surface becomes more uneven with an increasing layer thickness.

As described above, a higher recording density would hardly be provided to magnetic recording media, if one wanted to manufacture the magnetic recording media with excellent productivity by any of the conventional techniques. Thus, there is a need for a magnetic recording medium manufacturing technique that allows greater productivity, while producing a product that exhibits a high recording density. The present invention addresses this need.

SUMMARY OF THE INVENTION

The present invention relates to a magnetic recording medium, which can be mounted on various magnetic recording apparatuses, and the method of manufacturing such a magnetic recording medium, and the magnetic recording medium formed thereby.

One aspect of the present invention is the magnetic recording medium, which can include a nonmagnetic substrate, an underlayer above the nonmagnetic substrate, a magnetic recording layer on the underlayer, and an overcoating layer on the magnetic recording layer. The magnetic recording layer can be a granular magnetic layer, including ferromagnetic crystal grains and an oxide nonmagnetic grain boundary, or a nitride nonmagnetic grain boundary surrounding the ferromagnetic crystal grains. The overcoating layer can contain a nonmagnetic metal or a nonmagnetic alloy diffused into the nonmagnetic grain boundary.

The magnetic recording medium according to the first aspect of the invention does not employ the conventional CoCrPt layer for the magnetic layer thereof but rather a granular magnetic layer including ferromagnetic crystal grains and a nonmagnetic oxide grain boundary or a nonmagnetic nitride grain boundary surrounding the ferromagnetic crystal grains. The magnetic recording medium also can include a nonmagnetic metal layer or a nonmagnetic alloy layer deposited on the granular magnetic layer. In contrast to the conventional CoCrPt magnetic recording layer, the coated atoms diffuse into the nonmagnetic crystal grain boundary of the granular magnetic layer without annealing, and promote isolation of the ferromagnetic crystal grains from each other.

The nonmagnetic metal or the nonmagnetic alloy can be composed of an element selected from the group consisting of Sc, Ti, V, Cr, Mn, Cu, Zn, Al, Y, Zr, Nb, Mo, Tc, Ru, Rh, Pd, Ag, Cd, In, Sn, Sb, Hf, Ta, W, Re, Os, Ir, Pt, and Au. When the nonmagnetic metal or the nonmagnetic alloy is selected from this group, the atoms coated on the granular magnetic layer diffuse easily into the nonmagnetic grain boundary of the granular magnetic layer.

Another aspect of the present invention is the method of manufacturing a magnetic recording medium, which can include steps of forming the underlayer above the nonmagnetic substrate, forming the magnetic recording layer on the underlayer, and forming the overcoating layer on the magnetic recording layer.

The overcoating layer can be removed after diffusing the nonmagnetic metal or the nonmagnetic alloy into the nonmagnetic grain boundary. By removing a part of or the entire of the overcoating layer, the magnetic spacing can be narrowed, the SNR can be improved, the magnetic layer surface can be flattened, and therefore, the head floating can be stabilized.

Another aspect of the present invention is a product formed by the above-described method.

DETAILED DESCRIPTION

Figure 1:
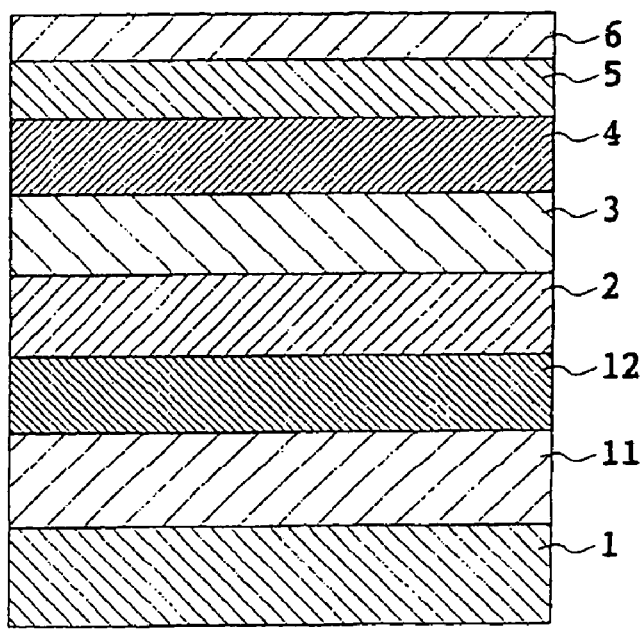
FIG. 1 is a schematic cross sectional view of a perpendicular magnetic recording medium according to an embodiment of the invention.

Now the invention will be described in detail hereinafter with reference to the accompanied drawing figures. Throughout the drawing figures, the constituent elements exhibiting similar functions are designated by the same reference numerals.

Referring to FIG. 1, which is a schematic cross sectional view of a perpendicular magnetic recording medium according to the invention, the perpendicular magnetic recording medium according to the invention includes at least a nonmagnetic substrate 1, an underlayer 2 above the nonmagnetic substrate 1, a magnetic recording layer 3 on the underlayer 2, and an overcoating layer 4 on the magnetic recording layer 3. The overcoating layer 4 can be removed by etching after the overcoating layer 4 is formed. A protective layer 5 can be formed on the overcoating layer 4 and a liquid lubricant layer 6 can be formed on the protective layer 5. For forming a double-layered perpendicular magnetic recording medium, a soft magnetic underlayer 11 can be formed below the underlayer 2. The constituent layers will be described below in detail.

The nonmagnetic substrate can be composed of materials such as an Al alloy plate provided with NiP plating and a reinforced or crystallized glass plate used for the conventional magnetic recording. Since no heating step is employed in manufacturing the magnetic recording medium according to the present invention, the substrate 1 can be composed of plastic substrates, such as a polycarbonate plate and a polyolefin plate.

The underlayer 2 can be composed of metals having a hexagonal close packed (hcp) lattice structure, alloys containing one of the metals having the hcp lattice structure, metals having a face-centered cubic (fcc) lattice structure or alloys containing one of the metals having the fcc lattice. The metals having the hcp lattice structure include, for example, Ti, Zr, Ru, Zn, Tc, and Re. The metals having the fcc lattice structure include, for example, Cu, Rh, Pd, Ag, Ir, Pt, Au, Ni, and Co. Although the underlayer 2 is preferably thin, 3 nm or thicker in thickness is preferable for facilitating sufficient crystal growth therein. A seed layer 12 can be formed below the underlayer 2 to improve the crystalline orientation in the underlayer 2.

For obtaining a double-layered perpendicular magnetic recording medium, a soft magnetic underlayer 11 can be formed below the underlayer 2 to converge the magnetic flux generated from a magnetic head. The underlayer 11 can be composed of NiFe alloy crystals, Sendust (FeSiAl) alloys, FeTaC microcrystals, CoTaZr microcrystals, and amorphous Co alloys such as CoZrNb. Although the optimum thickness of the soft magnetic underlayer 111 changes depending on the structure and the characteristics of the magnetic recording head, the soft magnetic underlayer 11 is preferably from 10 nm to 500 nm in thickness taking the productivity thereof into consideration.

The magnetic recording layer 3 is composed of a granular magnetic layer, including ferromagnetic crystal grains and a nonmagnetic oxide grain boundary or a nonmagnetic nitride grain boundary surrounding the ferromagnetic crystal grains. For example, alloys such as CoPt and FePt, CoPt alloys, and FePt alloys, to which Cr, Ni, Nb, Ta, B, and such an element are added, are preferable for the ferromagnetic crystal. For example, oxides and nitrides of Cr, Co, Si, Al, Ti, Ta, Hf, Zr, Y and Ce are preferable for the nonmagnetic grain boundary. As far as the materials described above exemplary are used for the ferromagnetic crystal grains and the nonmagnetic grain boundary, the atoms of the nonmagnetic metal or the nonmagnetic alloy coated on the granular magnetic layer are diffused easily into the nonmagnetic grain boundary without any help of annealing, isolation of the ferromagnetic grains is promoted, and the media noises are reduced. The materials for the ferromagnetic crystal grain and the oxide and the nitride for the nonmagnetic grain boundary are not limited to those described above. For obtaining a perpendicular magnetic recording medium, it is necessary for the c-axis of the Co crystal having a hcp lattice structure to orient perpendicular to the recording plane of the medium.

The overcoating layer can be composed of any of the nonmagnetic metals Sc, Ti, V, Cr, Mn, Cu, Zn, Al, Y, Zr, Nb, Mo, Tc, Ru, Rh, Pd, Ag, Cd, In, Sn, Sb, Hf, Ta, W, Re, Os, Ir, Pt, and Au, or nonmagnetic alloys containing at least one of Sc, Ti, V, Cr, Mn, Cu, Zn, Al, Y, Zr, Nb, Mo, Tc, Ru, Rh, Pd, Ag, Cd, In, Sn, Sb, Hf, Ta, W, Re, Os, Ir, Pt, and Au. The atoms in the overcoating layer 4 diffuse into the grain boundary in the magnetic recording layer 3 and reduce the magnetic interaction between the ferromagnetic crystal grains in the magnetic recording layer 3. The overcoating layer 4 is preferably 10 nm or less in thickness to reduce the magnetic spacing between the magnetic head and the magnetic recording medium.

Further for improving the SNR (signal to noise ratio) characteristics, a part of or the entire of the residual overcoating layer 4 remaining on magnetic recording layer 3, can be removed by etching. The removal of a part of or the entire of the residual overcoating layer 4 facilitates to reduce the magnetic spacing and smooth the surface of the magnetic recording medium. The removal can be conducted by Ar plasma etching, ECR plasma etching, ion beam etching, and similar etching technique.

The protective layer 5 can be composed of a thin film containing carbon as its main component. The liquid lubricant layer 6 can be composed of a perfluoropolyether lubricant or a similar liquid lubricant.

Now the invention will be described more in detail hereinafter with reference to the accompanied drawing figures, which illustrate the preferred embodiments of the invention. According to the first embodiment (E1), the nonmagnetic substrate 1 is composed of a flat and smooth chemically reinforced glass substrate (N-5 Glass Substrate supplied from Hoya Corp.). After cleaning, the glass substrate is loaded in a vacuum chamber of a sputtering apparatus, and a soft magnetic underlayer is formed by sputtering, using a Co5Zr9Nb target, resulting in a CoZrNb soft magnetic underlayer 11 of 300 mm in thickness. Then, a seed layer 12 is formed using a Ni15Fe5Cr target, which is a Ni-based soft magnetic alloy target, under the Ar gas pressure of 5 mTorr, resulting in a NiFeCr seed layer of 10 nm in thickness. Then, an underlayer 2 is formed using a Ru target under the Ar gas pressure of 30 mTorr, resulting in a Ru underlayer of 20 nm in thickness.

Then, a magnetic recording layer 3 is formed by sputtering using a 92(Co10Cr16Pt)-8SiO$_2$ target, resulting in a CoCrPt—SiO$_2$ magnetic recording layer of 20 nm in thickness. Then, an Mn overcoating layer is formed under the Ar gas pressure of 30 mTorr. The thickness of the Mn overcoating layer 4 ranges from 1 nm to 20 nm. Finally, a carbon protective layer 5 of 8 nm in thickness is formed on the overcoating layer 4. Then, the laminate formed is taken out from the vacuum chamber. Then, a perfluoropolyether layer is formed by dip-coating, resulting in a perfluoropolyether liquid lubricant layer 6 of 2 nm in thickness. Thus, double-layered perpendicular magnetic recording media E1 according to the first embodiment are obtained. The magnetic recording layer is formed by RF magnetron sputtering. The other layers except the liquid lubricant layer are formed by DC magnetron sputtering.

In a second embodiment (E2) according to the present invention, double-layered perpendicular magnetic recording media are fabricated in the same manner as the double-layered perpendicular magnetic recording media according to the first embodiment except that the overcoating layer is composed of Ta in the second embodiment.

In a third embodiment (E3) according to the present invention, double-layered perpendicular magnetic recording media are fabricated in the same manner as the double-layered perpendicular magnetic recording media according to the first embodiment except that the overcoating layer is composed of Cu in the third embodiment.

According to the fourth embodiment (E4) according to the present invention, double-layered perpendicular magnetic recording media are fabricated in the same manner as the double-layered perpendicular magnetic recording media according to the first embodiment except that the overcoating layer is composed of an Mn layer 3 nm in thickness, and the Mn overcoating layer is removed by an Ar plasma etching.

Comparative double-layered perpendicular magnetic recording medium C1 is fabricated in the same manner as the double-layered perpendicular magnetic recording media according to the first embodiment except that no overcoating layer is formed in the comparative double-layered perpendicular magnetic recording medium.

Figure 2:
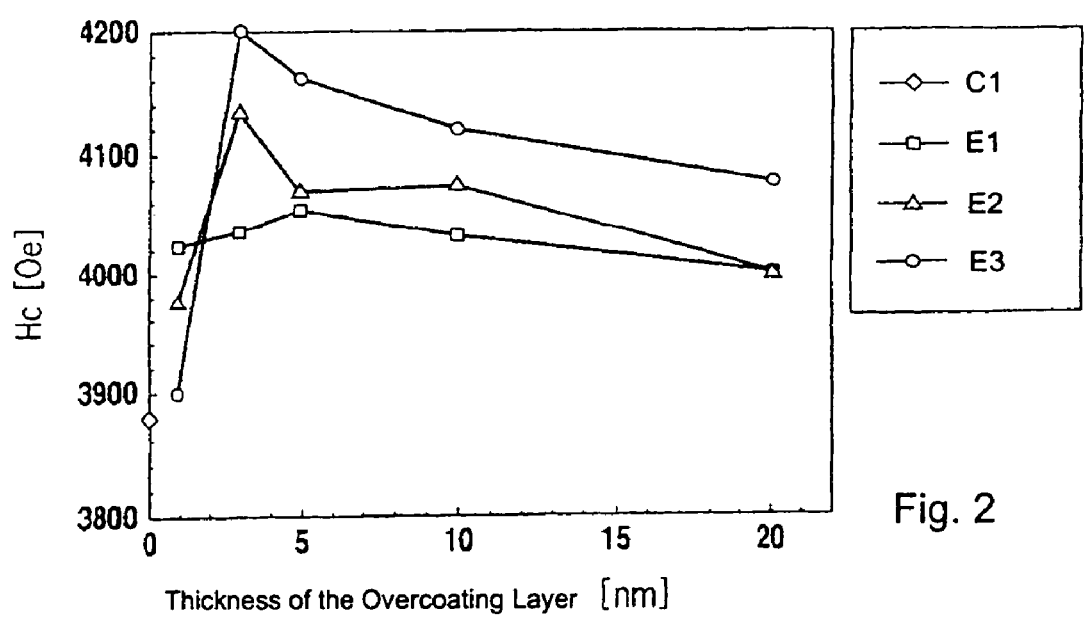
FIG. 2 is a set of curves relating the coercivity Hc and the thickness for the magnetic recording media according to the first through third embodiments of the invention and the comparative magnetic recording medium.

First, the evaluation results on the magnetic characteristics of the magnetic recording media E1 through E3 according to the first through third embodiments and the comparative magnetic recording medium C1 will be described below. The magnetic characteristics are measured in terms of the Kerr effect. FIG. 2 is a set of curves relating the coercivities Hc and the thickness for the magnetic recording media E1 through E3 according to the first through third embodiments and the comparative magnetic recording medium C1. The squareness ratio S of the magnetic recording media according to the first through third embodiments and the comparative magnetic recording medium is 1.0. The coercivities Hc of the magnetic recording media E1-E3 that include an overcoating layer according to the first through third embodiments are improved as compared with the coercivity Hc of the comparative magnetic recording medium. The coercivities Hc increase with increasing thickness of the overcoating layer and reach the respective maximum values when the thickness of the overcoating layer is between 3 nm and 5 nm. Thus, provision of an overcoating layer improves the coercivity Hc.

Table 1 below shows the comparative magnetic cluster size diameters d [nm] and the dispersions σ [nm] of the magnetic recording media, each including an overcoating layer of 3 nm in thickness, according to the first through third embodiments and the comparative magnetic recording medium. The magnetic cluster sizes are obtained from the magnetic force microscopic (MFM) measurements of the magnetic recording media demagnetized by AC demagnetization. The magnetic cluster size diameters d [nm] and the dispersions σ [nm] of the magnetic recording media including an overcoating layer according to the first through third embodiments are much smaller than the magnetic cluster size diameter d [nm] and the dispersion σ [nm] of the comparative magnetic recording medium. This indicates that the atoms in the overcoating layer diffuse into the grain boundary of the CoCrPt-SiO$_2$ magnetic layer and promotes magnetic isolation of the magnetic grains.

TABLE 1

| Examples | d [nm] | σ [nm] |
| --- | --- | --- |
| E1 | 17.6 | 7.4 |
| E2 | 20.5 | 9.2 |
| E3 | 26.3 | 11.7 |
| C1 | 31.4 | 12.6 |

Figure 3:
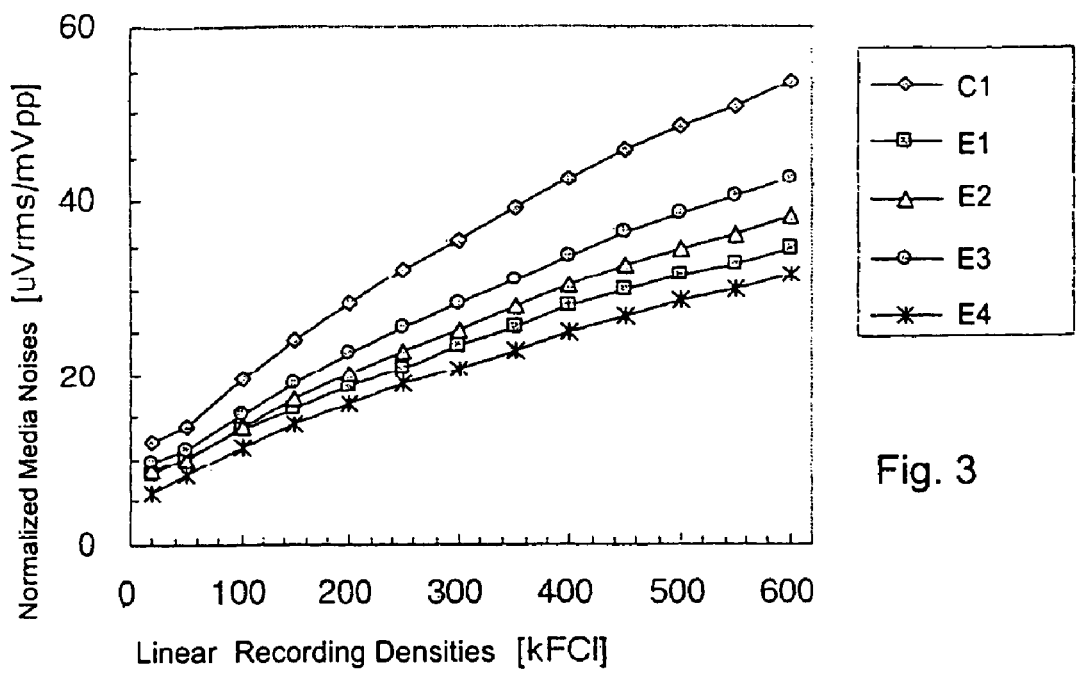
FIG. 3 is a set of curves relating the normalized media noises and the line recording densities for the magnetic recording media according to the first through fourth embodiments of the invention and the comparative magnetic recording medium.

Next, the evaluation results on the magnetic parametric performances of the magnetic recording media E1 through E4 according to the first through fourth embodiments and the comparative magnetic recording medium C1 will be described below. FIG. 3 is a set of curves relating the normalized media noises obtained from the evaluation results on the magnetic parametric performances and the linear recording densities for the magnetic recording media, each including an overcoating layer of 3 nm in thickness, according to the first through fourth embodiments, and the comparative magnetic recording medium C1 (without any overcoating layer). The magnetic parametric performances are measured by a spin stand tester using a giant magnetoresistive (GMR) head. As FIG. 3 clearly indicates, much less normalized media noises are generated in the magnetic recording media E1-E4 that include or used an overcoating layer according to the first through fourth embodiments than in the comparative magnetic recording medium. Comparing the magnetic recording media according to the first through third embodiments with each other, there exists a certain correlation between the diameter d and dispersion σ of the magnetic cluster size and the normalized media noise. In detail, the normalized media noise becomes lower from the magnetic recording medium according to the third embodiment exhibiting larger d and σ to the magnetic recording medium according to the first embodiment exhibiting smaller d and σ. In other words, the promoted magnetic grain isolation facilitates to reduce the media noises. The normalized media noise in the magnetic recording medium according to the fourth embodiment, where the overcoating layer thereof has been etched off after its formation, is further reduced as compared with the normalized media noise in the magnetic recording medium according to the first embodiment. The further reduced normalized media noise in the magnetic recording medium according to the fourth embodiment is attributable to the large increment of the output signals due to the smaller magnetic gap between the recording layer and the magnetic head.

Table 2 below shows the comparison of the SNRs at the linear recording densities of 400 kilo flux changes per inch (kFCI) and 600 KFCI of the magnetic recording media according to the first through fourth embodiments and the comparative magnetic recording medium. The SNRs are obtained by evaluating the magnetic parametric performances in the similar manner as the normalized media noises. By virtue of the higher Hc and lower media noises, the SNRs in the magnetic recording media according to the first through third embodiments, each including an overcoating layer, are much higher than the SNRs in the comparative magnetic recording medium that does not include or use any overcoating layer. The SNRs in the magnetic recording medium according to the fourth embodiment, where the overcoating layer thereof has been etched off after its formation, are even higher than the SNRs in the magnetic recording medium according to the first embodiment. Thus, it has been confirmed that the removal of the overcoating layer is very effective means to obtaining a higher SNR.

TABLE 2

| Examples | SNR [dB] | |
| --- | --- | --- |
| | @400 [kFCI] | @600 [kFCI] |
| E1 | 16.4 | 4.56 |
| E2 | 15.1 | 3.38 |
| E3 | 14.7 | 2.79 |
| E4 | 17.6 | 5.23 |
| C1 | 11.3 | 0.14 |

By using a granular magnetic layer for the magnetic recording layer and by depositing an overcoating layer on the granular magnetic recording layer as described above, the atoms in the overcoating layer diffuse into the grain boundary of the granular magnetic layer and promote isolation of the ferromagnetic grain crystals in the magnetic recording layer from each other. Since this scheme does not need any annealing treatment, the magnetic recording medium according to the invention is manufactured with excellent productivity. The magnetic recording medium according to the invention facilitates to reduce the magnetic interaction therein, reducing the media noises and realizing a higher recording density. Since it is sufficient for the overcoating layer to be 10 nm or less in thickness, the magnetic gap between the magnetic recording head and the recording layer is not widened by much. A narrower magnetic spacing obtained by etching off the overcoating layer after its formation facilitates to further improve the SNR and obtain a higher recording density.

As described above, the magnetic recording medium according to the invention includes a nonmagnetic substrate, an underlayer above the nonmagnetic substrate, a magnetic recording layer on the underlayer, and an overcoating layer on the magnetic recording layer. The magnetic recording layer is a granular magnetic layer including ferromagnetic crystal grains and an oxide nonmagnetic grain boundary or a nitride nonmagnetic grain boundary surrounding the ferromagnetic crystal grains, and the overcoating layer contains a nonmagnetic metal or a nonmagnetic alloy to be diffused into the nonmagnetic grain boundary. The atoms coated on the granular magnetic recording layer diffuse into the grain boundary and promote isolation of the ferromagnetic crystal grains from each other.

The magnetic recording medium manufactured according to the present invention provides excellent productivity, while producing products that have excellent magnetic recording properties, such as reduced media noise and a higher recording density.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2002-106928, in its entirety, including the drawings, claims, and the specification thereof, is incorporated herein by reference.

What is claimed is:

1. A method of manufacturing a magnetic recording medium, comprising:
   forming an underlayer above a nonmagnetic substrate;
   forming a magnetic recording layer on the underlayer; and
   forming an overcoating layer on the magnetic recording layer,
   wherein the magnetic recording layer comprises a granular magnetic layer comprising ferromagnetic crystal grains and a nonmagnetic grain boundary comprising an oxide or a nitride surrounding the ferromagnetic crystal grains, and
   wherein the overcoating layer comprises a nonmagnetic metal or a nonmagnetic alloy adapted to be diffused into the nonmagnetic grain boundary and the overcoating layer is removed after diffusing the nonmagnetic metal or the nonmagnetic alloy into the nonmagnetic grain boundary.

2. The method according to claim 1, wherein the nonmagnetic metal or the nonmagnetic alloy is composed of an element selected from the group consisting of Sc, Ti, V, Cr, Mn, Cu, Zn, Al, Y, Zr, Nb, Mo, Tc, Ru, Rh, Pd, Ag, Cd, In, Sn, Sb, Hf, Ta, W, Re, Os, Ir, Pt, and Au.

* * * * *